(12) United States Patent
Urata (10) Patent No.: US 7,746,889 B2
(45) Date of Patent: Jun. 29, 2010

(54) STORAGE DEVICE AND METHOD OF CONTROLLING ACCESS

(75) Inventor: Kaoru Urata, Kanagawa (JP)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 11/726,102

(22) Filed: Mar. 21, 2007

(65) Prior Publication Data

US 2007/0223515 A1    Sep. 27, 2007

(30) Foreign Application Priority Data

Mar. 23, 2006    (JP) .................... P2006-081620

(51) Int. Cl.
*H04L 12/43* (2006.01)
(52) U.S. Cl. .................. 370/458; 370/232; 386/125
(58) Field of Classification Search .......... 370/232, 370/458; 386/125; 711/151, 167; 710/244
See application file for complete search history.

(56) References Cited

U.S. PATENT DOCUMENTS

| | | | |
|---|---|---|---|
| 5,940,865 A * | 8/1999 | Ohzora et al. .......... 711/167 |
| 6,577,814 B1 * | 6/2003 | Ito et al. .......... 386/125 |
| 6,671,784 B2 * | 12/2003 | Lee .......... 711/151 |
| 7,230,922 B1 * | 6/2007 | Rodriguez-Sanchez et al. .. 370/232 |
| 2006/0129730 A1 * | 6/2006 | Morishima et al. .......... 710/244 |

FOREIGN PATENT DOCUMENTS

| | | |
|---|---|---|
| JP | 11 234625 | 8/1999 |
| JP | 11 308558 | 11/1999 |

\* cited by examiner

*Primary Examiner*—Albert T Chou
(74) *Attorney, Agent, or Firm*—Frommer Lawrence & Haug LLP; William S. Frommer; Thomas F. Presson (57) ABSTRACT

A storage device is provided. The storage device includes a plurality of ports for a first kind of access, a second kind of access having a band-secured access period longer than that of the first kind of access, and other kinds of access; and an access controller. The access controller is configured to prepare a total schedule by connecting a plurality of slot units for the first kind of access having a time frame within a band-secured access period to obtain the band-secured access period within the access period for the second kind of access on a time axis, and to allocate one time slot to one slot unit regarding the ports for the first kind of access and to allocate one time slot to one period of the total schedule regarding the ports for the second kind of access among the plurality of ports.

5 Claims, 6 Drawing Sheets

RELATED ART

FIG. 3

RELATED ART

FIG. 4

RELATED ART

FIG. 5

RELATED ART

STORAGE DEVICE AND METHOD OF CONTROLLING ACCESS

CROSS REFERENCES TO RELATED APPLICATIONS

The present invention contains subject manner related to Japanese Patent Application JP 2006-081620 filed in the Japanese Patent Office on Mar. 23, 2006, the entire contents of which being incorporated herein by reference.

BACKGROUND OF THE INVENTION

1. Field of the Invention

The present invention relates to a storage device having a plurality of ports to which time slots are allocated respectively to control access, and particularly to the storage device and a method of controlling access in the case where a necessary access period for securing a band varies depending on a kind of access.

2. Description of the Related Art

There is a data storing and reproducing system in which a plurality of external apparatuses store and reproduce data in a single storage device. A plurality of ports are provided to the storage device, and time slots (time frames for receiving access from the ports) are allocated to respective ports through which the apparatuses individually access to the storage device.

Figure 1:
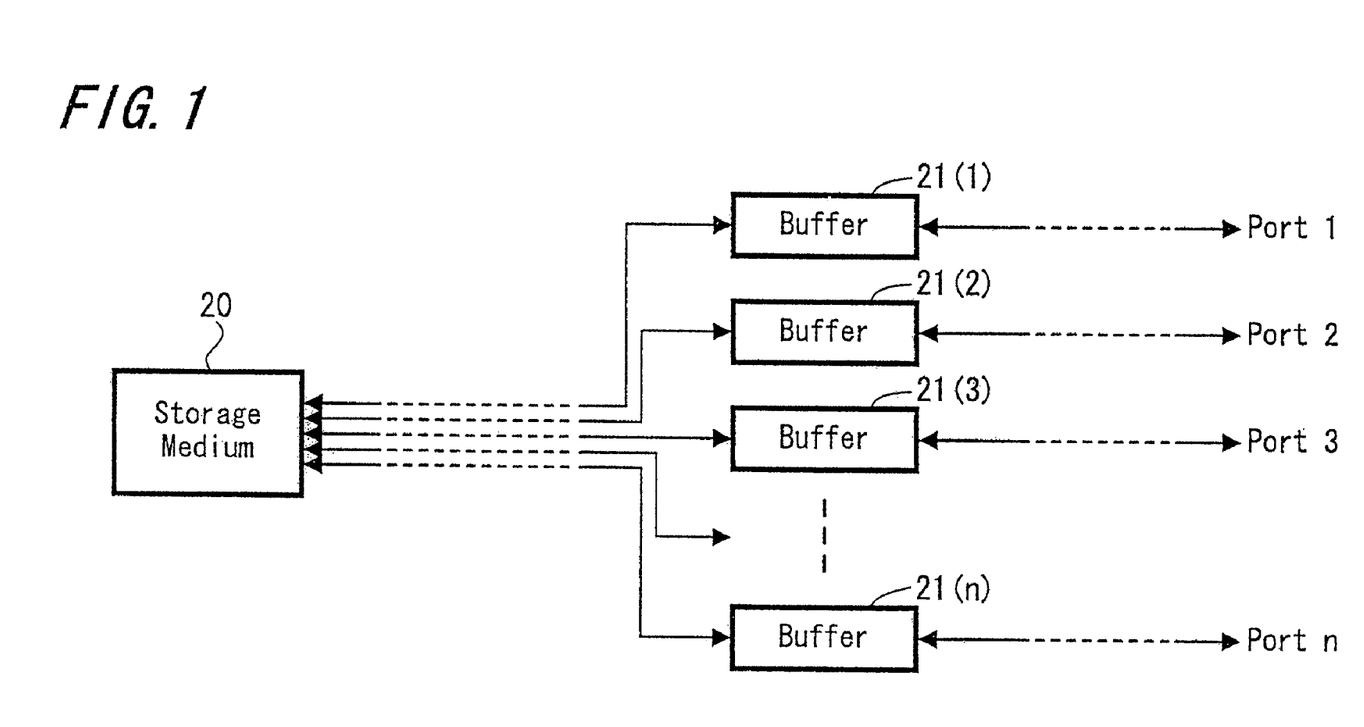
FIG. 1 is a diagram conceptually showing access to a storage device provided with a plurality of ports.

FIG. 1 is a diagram conceptually showing access to a storage device provided with a plurality of ports. Time slots are allocated to n ports (Port1 to Portn) provided in the storage device respectively. Buffer memories 21 (21(1) to 21(n)) are provided corresponding to the respective Port1 to Portn in the storage device.

In the case where data is stored from a Porti in the Port1 to Portn, the data input from the Porti is stored temporarily in a buffer memory 21(i), then, is read from the buffer memory 21(i) at a time slot allocated to the Porti, and is written into a storage medium 20 (for example, a flash memory in the case of a flash memory device that is a kind of semiconductor storage device) in the storage device.

Further, in the case where data is reproduced from a Portj, the data is read from the storage medium 20 at a time slot that is allocated to the Portj, and is stored temporarily in a buffer memory 21(j), then is read from the buffer memory 21(j), and is output to the Portj.

In the case of allocating the time slots to the plurality of ports of the storage device as described above, in order to secure a band for access to the storage device (in order to secure a specific traffic volume), it is necessary to access to the storage device for a certain period of time per unit time from the port where the band-secured access is carried out.

Here, in the case where a length of access time per unit time necessary for securing the band is uniform irrespective of the kind of access, the same number of time slots each having an equal length are allocated to ports where the band-secured access is carried out (see Japanese Unexamined Patent Application Publication No. H11-234625, paragraphs 0013 to 0019, FIGS. 1 and 5; and Japanese Unexamined Patent Application Publication No. H11-308558, paragraphs 0022 to 0025, FIGS. 1 and 2).

However, the length of access time per unit time necessary for securing the band may vary depending on the kind of access. For example, time necessary for reproducing a certain amount of data is longer than time necessary for storing the same amount of data in a flash memory device. Therefore, a long access time per unit time is necessary for securing the band for a port accessed for data reproduction, compared with a port accessed for data storage.

Further, in the case where data is reproduced, a larger amount of data should be reproduced per unit time at a transfer rate of 50 Mbps, compared with the reproduction at a transfer rate of 30 Mbps, for example. Therefore, access time per unit time necessary for securing the band at a port accessed for reproduction at a transfer rate of 50 Mbps is longer than that at a port accessed for reproduction at a transfer rate of 30 Mbps.

Figure 2:
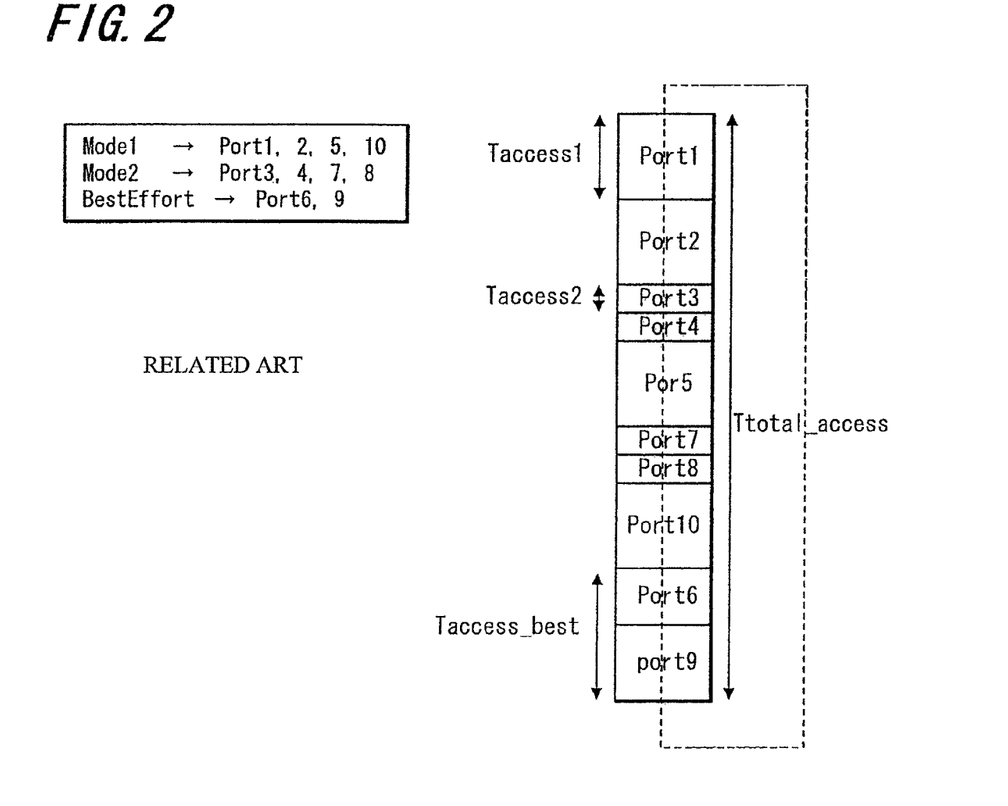
FIG. 2 is a diagram illustrating a method of controlling access of the related art in a storage device provided with a plurality of ports.

FIG. 2 shows a method of controlling access according to the related art regarding the above described case. Here, three kinds of access modes such as a Mode1, Mode2 and BestEffort are shown. Both the Mode1 and Mode2 are access modes the bands of which should be secured, but a necessary access time per unit time for securing the band of the Mode1 is longer than that of the Mode2. The BestEffort is an access mode the band of which is not secured, but a transfer rate thereof is made as high as possible (performance-based mode).

Further, there are provided ten ports (Port1 to Port10), and the Mode1 accesses the Port1, 2, 5, 10, and the Mode2 accesses the Port3, 4, 7, 8, and the BestEffort accesses the Port6, 9.

One time slot is allocated to each of the Port1, 2, 5, 10 for the Mode1 and to each of the Port3, 4, 7, 8 for the Mode2. A time slot length Taccess 1 for each of the ports for the Mode1 and a time slot length Taccess 2 for each of the ports for the Mode2 are set so that the following condition is satisfied.

Condition: an access period necessary for securing a band for the access of the Mode1, which is an amount of data in terms of a time length that buffer memories (buffer memories 21 in FIG. 1) corresponding to the ports for the Mode1 should store per access, is expressed as Tbuf 1 and an access period necessary for securing a band for the access of the Mode2 is similarly expressed as Tbuf 2, and the relationship between the Tbuf 1 and Tbuf 2 is represented by:

(Formula 1)

$$Tbuf1 \approx Tbuf2 \qquad (1)$$

Further, time slots for the Port6, 9 for the BestEffort are located at the end, and a time slot length Taccess_best of the ports for the BestEffort is controlled so that a total of all the time slot lengths Ttotal_access satisfies the condition expressed by the following formula, thereby securing the band for the access of each of the Mode1 and Mode2.

(Formula 2)

$$Taccess1 \times Nmode1 + Taccess2 \times Nmode2 + Taccess\_best = Ttotal\_access \leq Tbuf \qquad (2)$$

where Tbuf is the shorter one of Tbuf 1 and Tbuf 2, and Nmode1 and Nmode2 are the number of ports accessed by the Mode1 and Mode2 respectively (here, Nmode1 is four, Nmode2 is four).

SUMMARY OF THE INVENTION

According to the method of controlling access shown in FIG. 2, however, even if the Mode1 is the kind of access capable of making an access period Tbuf 1 short by reducing time per access, the Mode1 is not allowed to make time per access short in the following case. Specifically, in the case where the Mode2 is the kind of access incapable of reducing time per access and accordingly incapable of making an access period Tbuf 2 short, the access period Tbuf 1 may not be shortened, because according to the condition expressed by the above-described formula 1 it is necessary for the access period Tbuf 1 and access period Tbuf 2 to have almost the same length.

For example, the time per access can be made short in the case of access for reproducing data in a flash memory device, because an access speed for the reproduction may not be lowered even if the access is made by a unit of page that is smaller than a block of a flash memory. However, the time per access may not be made short in the case of access for storing data in the flash memory device at a high speed, because the access may need to be made by a unit of block. The above-described Mode1 corresponds to the access when reproducing data, and similarly the Mode2 corresponds to the access when storing data.

Figure 3:
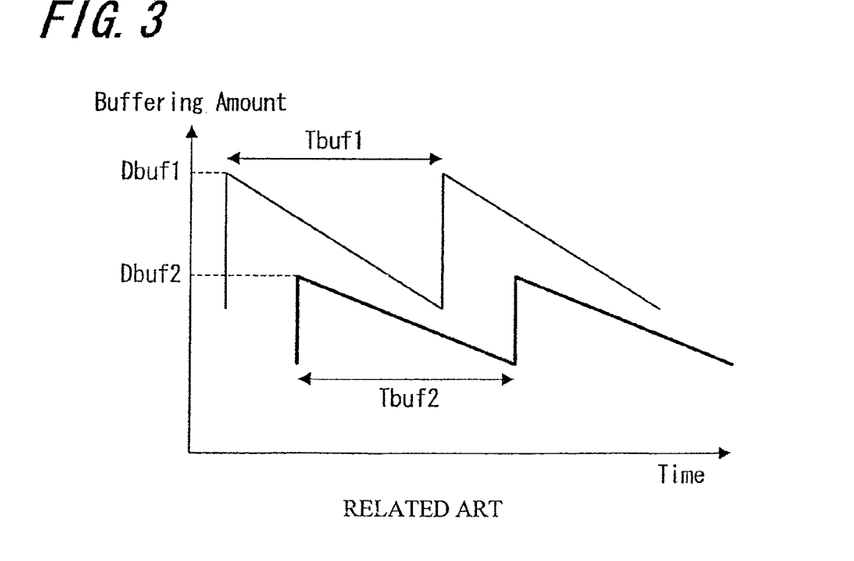
FIG. 3 is a diagram showing a change in the amount of buffering according to the method of controlling access illustrated in FIG. 2.

FIG. 3 is a diagram showing a change in a buffering amount representing data storage amount of buffer memories (buffer memories 21 in FIG. 1) corresponding to ports for the Mode1 and Mode2, according to the method of controlling access illustrated in FIG. 2. In the case where the Mode2 is the kind of access incapable of making time per access short even if the Mode1 is the kind of access capable of making time per access short, an interval where the access of the Mode1 is repeated becomes long, because the access period Tbuf 1 may not be shortened. Therefore, delay until the access is received after an access request from the Mode1 is large (up to maximum Tbuf 1), and consequently reaction of the storage device when making the access of Mode1 is slow for external devices.

Further, as shown in FIG. 3, since an interval at which access of the Mode1 is repeated may be long, a maximum buffering amount Dbuf 1 of buffer memories corresponding to the ports for the Mode1 becomes large. Therefore, a buffer memory size preventing buffer memories corresponding to the ports for the Mode1 from overflowing and underflowing may need to be increased in accordance with the maximum value Dbuf 1.

Figure 4:
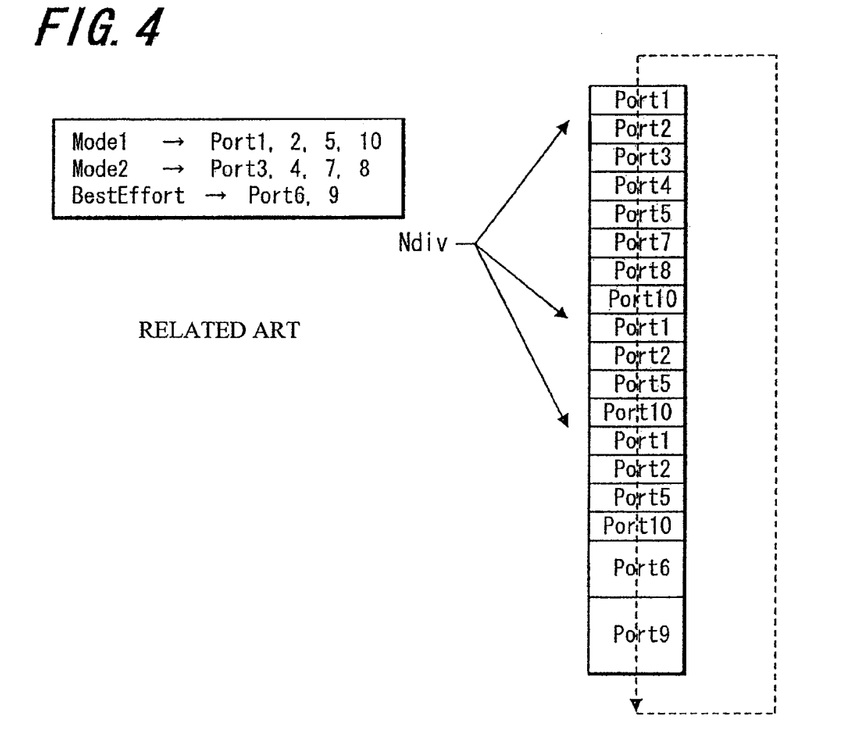
FIG. 4 is a diagram illustrating an example of the method of controlling access improved from the method of controlling access shown in FIG. 2.

On the other hand, FIG. 4 shows an improved example of the method of controlling access in the case where the Mode1 is the kind of access capable of making time per access short. In the example, time slots of Ndiv units (Ndiv is an integer of 2 or more, Ndiv is 3 in the figure) are allocated to each of the Port1, 2, 5, 10 for the Mode1. A time slot length Taccess 1 of respective ports for the Mode1 and a time slot length Taccess 2 of respective ports for the Mode2 are set so that an access period Tbuf 1 for securing the band for access of the Mode1 and an access period Tbuf 2 for securing the band for access of the Mode2 satisfy the condition expressed by the following formula 3.

(Formula 3)

$$Tbuf1 \times Ndiv \approx Tbuf2 \quad (3)$$

Accordingly, the time slot length Taccess 1 of respective ports for the Mode1 is shorter than that in the case shown in FIG. 2.

Further, time slots for the Port6, 9 for the BestEffort are located at the end, and a time slot length Taccess_best of the ports for the BestEffort is controlled so that a total of all the time slot lengths Ttotal_access satisfies the condition expressed by the following formula, thereby securing the band for the access of each of the Mode1 and Mode2.

(Formula 4)

$$Taccess1 \times Nmode1 \times Ndiv + Taccess2 \times Nmode2 + Taccess\_best = Ttotal\_access \leq Tbuf2 \quad (4)$$

Figure 5:
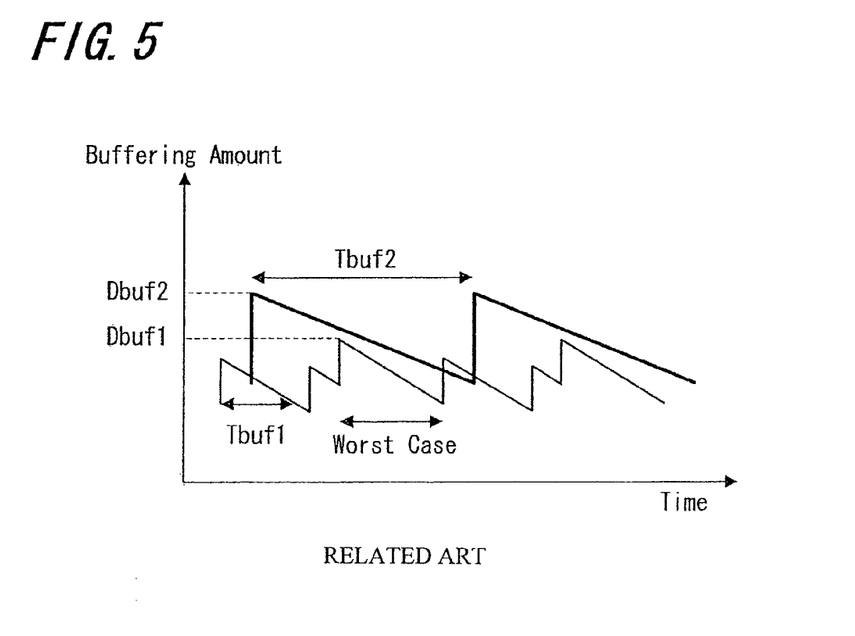
FIG. 5 is a diagram showing a change in the amount of buffering according to the improved example illustrated in FIG. 4.

FIG. 5 is a diagram showing a change in a buffering amount of buffer memories corresponding to the ports for the Mode1 and Mode2 according to the above improved example.

According to the above improved example, an interval at which access of the Mode1 is repeated may be shorter than the interval at which access of the Mode2 is repeated, but may be uneven. Since a delay time of the access should be estimated considering the worst case (based on the longest access interval), the delay time is still long although that is improved compared with the case of the method of controlling access illustrated in FIG. 2 (see FIG. 3).

Further, a buffering amount of the buffer memories corresponding to the ports for the Mode1 may be smaller than the buffering amount according to the method of controlling access shown in FIG. 2; however, as shown in FIG. 5, a larger maximum value Dbuf 1 than others may occur in the worst case. Therefore, a buffer memory size preventing buffer memories corresponding to the ports for the Mode1 from overflowing or from underflowing may need to be increased in accordance with the maximum value Dbuf 1.

In view of the above, in the case where two kinds of access, such as the above Mode1 and Mode2, having different access periods necessary for securing a band from each other, are implemented in a storage device, it is desirable to reduce a delay time and buffer memory size of the kind of access having a shorter access period.

SUMMARY OF THE INVENTION

According to an embodiment of the present invention, there is provided a storage device including a plurality of ports and an access controller. The plurality of ports are provided for a first kind of access, a second kind of access having a band-secured access period longer than that of the first kind of access, and other kinds of access. The access controller prepares a total schedule by connecting on a time axis a plurality of slot units each having a length within the band-secured access period of the first kind of access so that the access period of the second kind of access is within the band-secured access period, allocates one time slot to one slot unit regarding the ports for the first kind of access, and allocates one time slot to one period of the total schedule regarding the ports for the second kind of access among the plurality of ports.

According to the storage device, the first kind of access having a short band-secured access period and the second kind of access having a long band-secured access period are provided, and the total schedule is prepared by connecting on a time axis a plurality of slot units each having a length within the band-secured access period of the first kind of access so that the access period of the second kind of access is within the band-secured access period.

Further, one time slot is allocated per slot unit regarding the ports for the first kind of access, thereby allocating a plurality of time slots at almost even intervals for one period of the total schedule. On the other hand, only one time slot is allocated per total schedule regarding ports for the second kind of access, among the plurality of ports.

Accordingly, an interval at which the first kind of access is repeated is shorter than that at which the second kind of access is repeated, and also the former intervals are almost constant (specifically the interval is short also in the worst case). Accordingly, a delay time until receiving the access after requesting the first kind of access (a kind of access having a short band-secured access period) is short. As a result, a reaction of the storage device in the case of the kind of access having a short band-secured access period is fast for external devices.

Further, because the intervals at which the first kind of access is repeated is short and almost constant as described above, a maximum value of the buffering amount of a buffer memory provided corresponding to the ports to which the first kind of access (a kind of access having a short band-secured access period) is implemented becomes small. Accordingly, a buffer memory size that prevents the buffer memory from overflowing or underflowing can be made small.

According to an embodiment of the present invention, there is provided a method of controlling access performed by an access controller in a storage device having a plurality of ports, including the following steps. The steps are: accessing the ports with a first kind of access; accessing the ports with a second kind of access having a band-secured access period longer than that of the first kind of access; preparing a total schedule by connecting a plurality of slot units for the first kind of access having a time frame within a band-secured access period and obtaining the band-secured access period within the access period for the second kind of access on a time axis. The method further includes the steps of: allocating one time slot to one slot unit regarding the ports for the first kind of access among the plurality of ports and allocating one time slot to one period of the total schedule regarding the ports for the second kind of access among the plurality of ports.

The method of controlling access corresponds to a method of controlling access performed by the storage device according to an embodiment of the present invention, and a delay time until receiving the access after requesting the kind of access having a short band-secured access period can be made short, and a buffer memory size provided corresponding to the ports receiving a kind of access having a short band-secured access period can be made small.

According to an embodiment of the present invention, in the case where two kinds of access having different band-secured access periods from each other are implemented to a storage device from a plurality of ports, a delay time until receiving the access after requesting the kind of access having a short band-secured access period becomes short. Therefore, a reaction of the storage device in the case of a kind of access having a short band-secured access period becomes fast for external devices.

Further, a size of a buffer memory provided corresponding to the port receiving a kind of access having a short band-secured access period can be made small.

DESCRIPTION OF THE PREFERRED EMBODIMENTS

Figure 6:
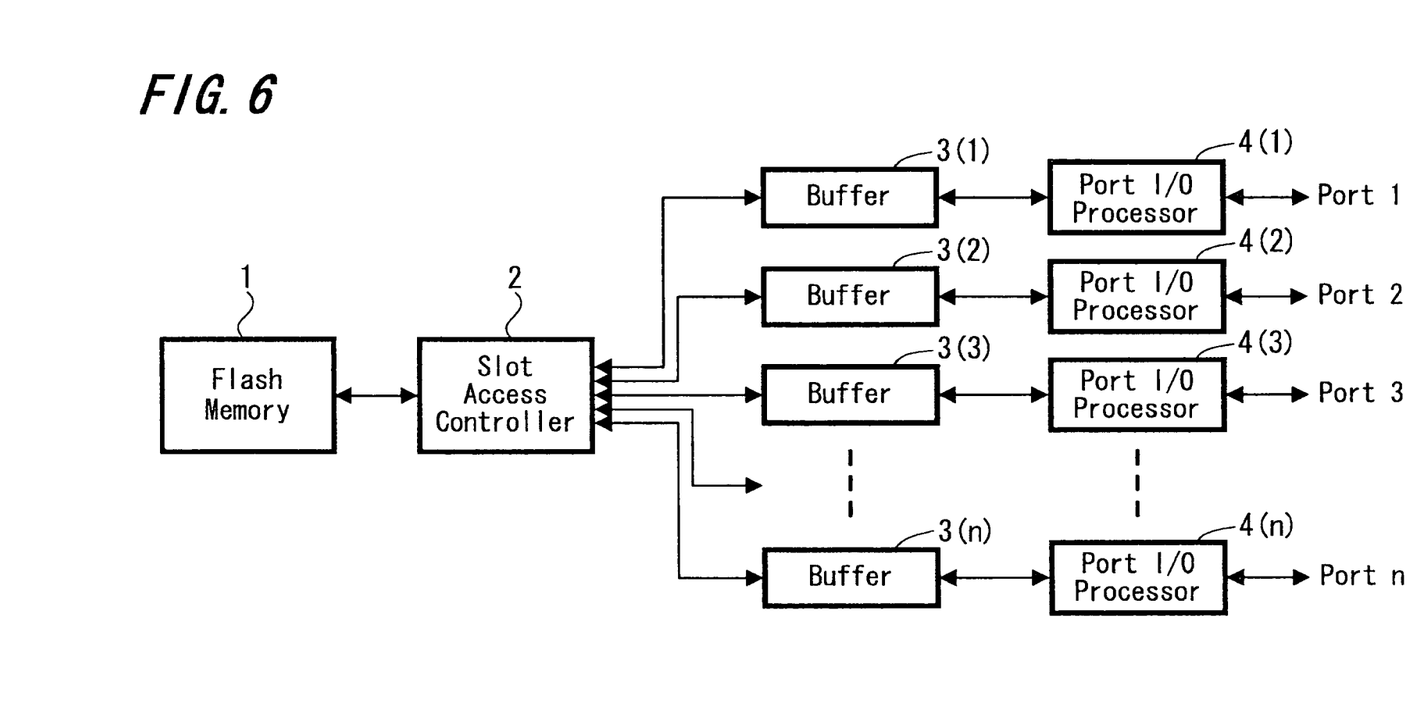
FIG. 6 is a block diagram showing the whole configuration of a flash memory device according to an embodiment of the present invention.

Embodiments of the present invention are hereinafter described with reference to drawings. FIG. 6 is a block diagram showing the whole configuration of a flash memory device according to an embodiment of the present invention. The flash memory device includes a flash memory 1, slot access controller 2, N buffer memories 3 (3(1) to 3(n)) and N port input/output processors 4 (4(1) to 4(n)).

The slot access controller 2 controls access to the flash memory 1 from a plurality of ports (Port1 to Portn) provided to the flash memory device by allocating time slots.

Each of the buffer memories 3(1) to 3(n) and the Port input/output processors 4(1) to 4(n) has one to one correspondence with the Port1 to Portn. Each of the Port input/output processors 4(1) to 4(n) has a function of processing (for example, compressing) signals in order to convert data input from the Port1 to Portn to data having a suitable format stored in the flash memory 1, and a function of processing signals (for example, expansion of compressed data) on the data supplied from the buffer memories 3(1) to 3(n) to be output from the Port1 to Portn.

In the case where data is stored from a certain Porti among Port1 to Portn, the data input from the Porti is temporarily stored in a buffer memory $3(i)$ through the processing of a port input/output processor $4(i)$. Then, the data is read from the buffer memory $3(i)$ at a time slot allocated to the Porti by the slot access controller 2, is transferred to a flash memory 1 from the slot access controller 2, and is written into the flash memory 1.

Further, in the case where data is reproduced from a certain Portj, the data is read by the slot access controller 2 at a time slot allocated to the Portj from the flash memory 1, and is transferred to and temporarily stored in a buffer memory $3(j)$. Then, the stored data is read from the buffer memory $3(j)$, and is output from the Portj through the processing of a port input/output processor $4(j)$.

Figure 7:
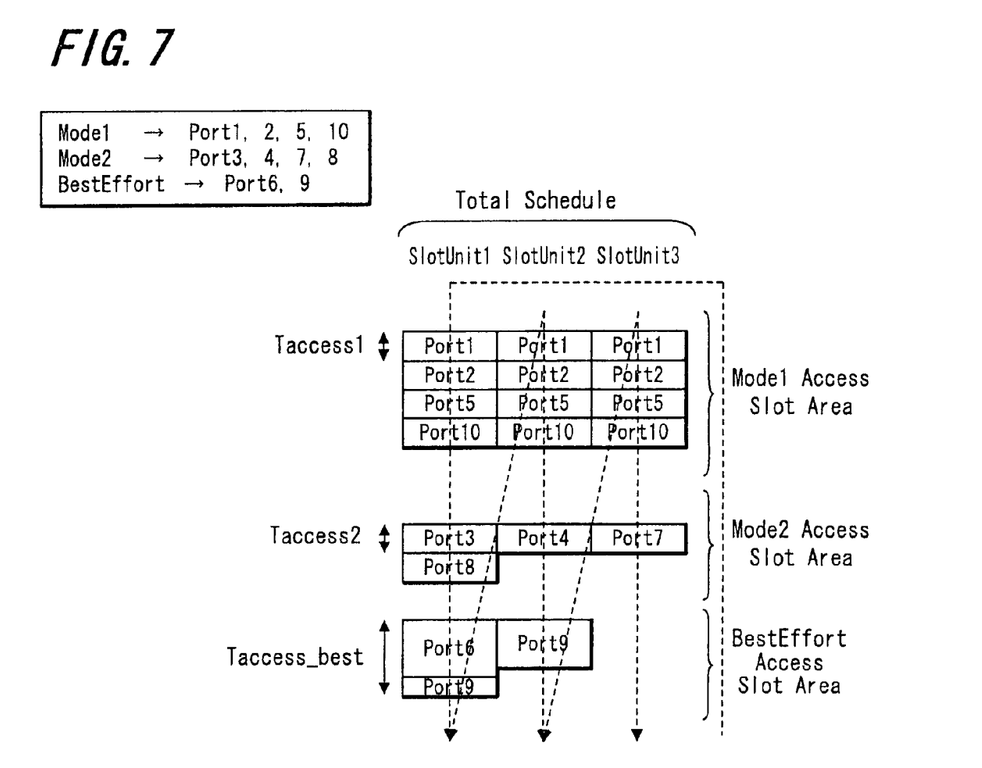
FIG. 7 is a diagram illustrating a method of controlling access according to a slot access controller shown in FIG. 6.

FIG. 7 illustrates a method of controlling access that the slot access controller carries out. Three kinds of access modes such as Mode1, Mode2, and BestEffort are herein employed. Both the Mode1 and Mode2 are kinds of access to be band-secured, but a necessary access time per unit time for securing the band of the Mode1 is longer than that of the Mode2. The BestEffort is a kind of access the band of which is not secured, but a transfer rate thereof is made as high as possible (performance-based access). The Mode1 is, for example, access for data that request real-time reproduction. The Mode2 is, for example, access for data that request real time storage. The BestEffort is, for example, access for data that may not request real time storage or reproduction and may be the file transfer via a network.

Here, ten ports (Port1 to Port10) are prepared. The Port1, 2, 5, 10 are used for the access of the Mode1; the Port3, 4, 7, 8 are used for the access of the Mode2; and the Port6, 9 are used for the access of the BestEffort. It should be noted that ports used for respective modes may be fixed in advance or may be changed dynamically.

A length of one time slot Taccess 1 allocated to each of the Port1, 2, 5, 10 for the Mode1, and a length of one time slot Taccess 2 allocated to each of the Port3, 4, 7, 8 for the Mode2 are set so that the following conditions are satisfied.

Condition: an access period necessary for securing a band for the access of the Mode1, which is an amount of data in terms of a time length that buffer memories (buffer memories 21 in FIG. 6) corresponding to the ports for the Mode1 should store per access, is expressed as Tbuf 1 and an access period necessary for securing a band for the access of the Mode2 is similarly expressed as Tbuf 2, and the relationship between the Tbuf 1 and Tbuf 2 is represented by:

(Formula 5)

$$Tbuf1 \times M \approx Tbuf2 \qquad (5)$$

where, M is an integer of 2 or more, and M is 3 in the figure.

For example, in the case where the Mode1 and Mode2 are kinds of access for data that request real time reproduction and storage as described above, specifically, Taccess 1 can be set to a time length for the access to the flash memory to reproduce data by a unit of page that is smaller than a block, and Taccess 2 can be set to a time length for the access to the flash memory to store data by a unit of block.

Further, a total schedule is prepared by connecting M slot units (M is 3 in the figure, therefore, SlotUnit 1 to SlotUnit3 on a time axis (Note that, as shown in the figure, the time axis are divided into three and illustrated such that the end of the SlotUnit 1 continues diagonally upward in the figure to the top of the SlotUnit 2, and the end of the SlotUnit 2 continues diagonally upward to the top of the SlotUnit 3, for convenience of drawing).

A Mode1 access slot area, a Mode2 access slot area and a BestEffort access slot area are provided to each of the SlotUnit1 to SlotUnit3 from the top to bottom (early to late in the time axis).

Then, regarding respective ports (Port1, 2, 5, 10) for the Mode1, when ports are open, one time slot of the aforementioned length Taccess 1 is allocated to a Mode1 access slot area in each of the SlotUnit1 to SlotUnit3 (M=3 for a total schedule).

Also, regarding respective ports (Port3, 4, 7, 8) for the Mode2, when ports are open, one time slot of the aforementioned length Taccess 2 is allocated to a Mode2 access slot area in order from the SlotUnit1 (one per total schedule). In the figure, Port3 is first opened and a time slot is allocated to a Mode2 access slot area in the SlotUnit1, and secondly Port4 is opened and a time slot is allocated to a Mode2 access slot area in the SlotUnit2, and thirdly Port7 is opened and a time slot is allocated to a Mode2 access slot area in the SlotUnit3. Further, fourthly Port8 is opened and a time slot is allocated to a Mode2 access slot area in the SlotUnit1 (in the time position subsequent to the time slot of Port3).

Further, a length of time slot Taccess_best allocated to a BestEffort access slot area in SlotUnit1 to SlotUnit3 is controlled to satisfy the condition expressed by the following formula (6).

(Formula 6)

$$Taccess1 \times Nmode1 + Taccess2 \times Roundup(Nmode2/M, 0) + Taccess\_best \leq Tbuf1 \qquad (6)$$

where, Nmode1 and Nmode2 are the number of ports accessed by the Mode1 and Mode2 respectively (here, Nmode1=4, Nmode2=4), and Roundup (Nmode2/M, 0) is an integer obtained by rounding Nmode2/M up (here, it is an integer 2 that rounded 4/3 up).

As shown in the figure, in order to satisfy the condition expressed by the formula (6), a time slot for Port6 among ports for the BestEffort (Port6, 9) is allocated to a BestEffort access slot area in the SlotUnit1, and also a time slot for Port9 is allocated over a BestEffort access slot area in the SlotUnit1 (at the time position subsequent to a time slot of Port6) and a BestEffort access slot area in the SlotUnit2.

With the condition expressed by the above formula (6) being satisfied, a time slot is allocated to respective ports (Port1, 2, 5, 10) for the Mode1 with an interval within an access period Tbuf 1 necessary for securing the band, and therefore the band is secured for the access of the Mode1.

Further, based on the relationship of the formula (5) and formula (6), a length of one period of a total schedule Total_Schedule satisfies the condition expressed by the following formula (7).

(Formula 7)

$$Total\_Schedule \leq Tbuf1 \times M = Tbuf2 \qquad (7)$$

Accordingly, a time slot is also allocated to respective ports (Port3, 4, 7, 8) for the Mode2 with an interval within an access period Tbuf 2 necessary for securing the band, and therefore the band is also secured for the access of the Mode2.

Figure 8:
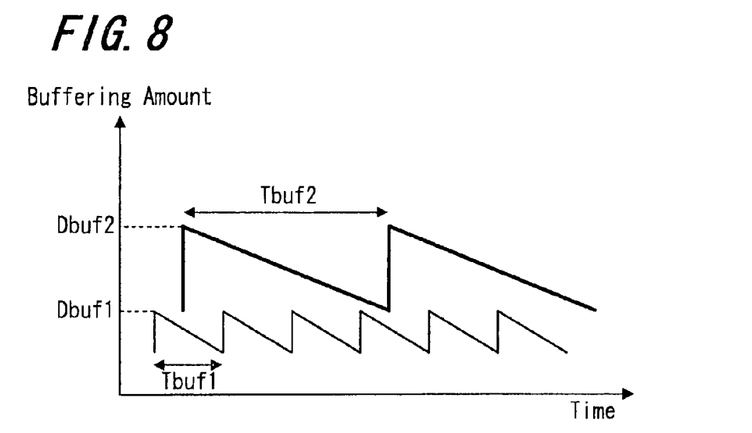
FIG. 8 is a diagram showing a change in the amount of buffering according to the method of controlling access shown in FIG. 7.

FIG. 8 is a diagram showing a change in a buffering amount representing data storage amount of buffer memories (buffer memories 3 in FIG. 6) corresponding to ports for the Mode1 and Mode2, according to the method of controlling access illustrated in FIG. 7. An interval where an access of the Mode1 is repeated is shorter than an interval where an access of the Mode2 is repeated, and also becomes almost constant (specifically, the interval becomes short even in the worst case).

Obtaining such short and almost constant intervals, where the access of the Mode1 is repeated, is advantageous regarding the following two points.

First, a delay time until receiving access after request of the access of the Mode1 from the buffer memories 3 in FIG. 6 becomes short.

For example, in the case of shuttle reproduction of video data, the buffer memory 3 determines an address of data read from the flash memory 1 corresponding to shuttle operation (operation of selecting reproduction speed such as 2×, 4× speed and 8×) performed by external devices, and makes an access request to the slot access controller 2 for reading the data of that address. Then, the slot access controller 2 receives and processes the request, thereby reading the data for the shuttle reproduction.

Therefore, a delay time until an access for shuttle reproduction of the Mode1 is received after the access request from the buffer memory 3 becomes short, and consequently reaction to the shuttle operation on video data output from ports of the flash memory device becomes fast (shuttle response is improved) for external devices performing shuttle operation.

Secondly, as shown in FIG. 8, a maximum buffering amount Dbuf 1 of buffer memories corresponding to the ports for the Mode1 becomes small. As a result, a buffer memory size preventing buffer memories corresponding to the ports for the Mode1 from overflowing and underflowing can be made small.

Figure 9:
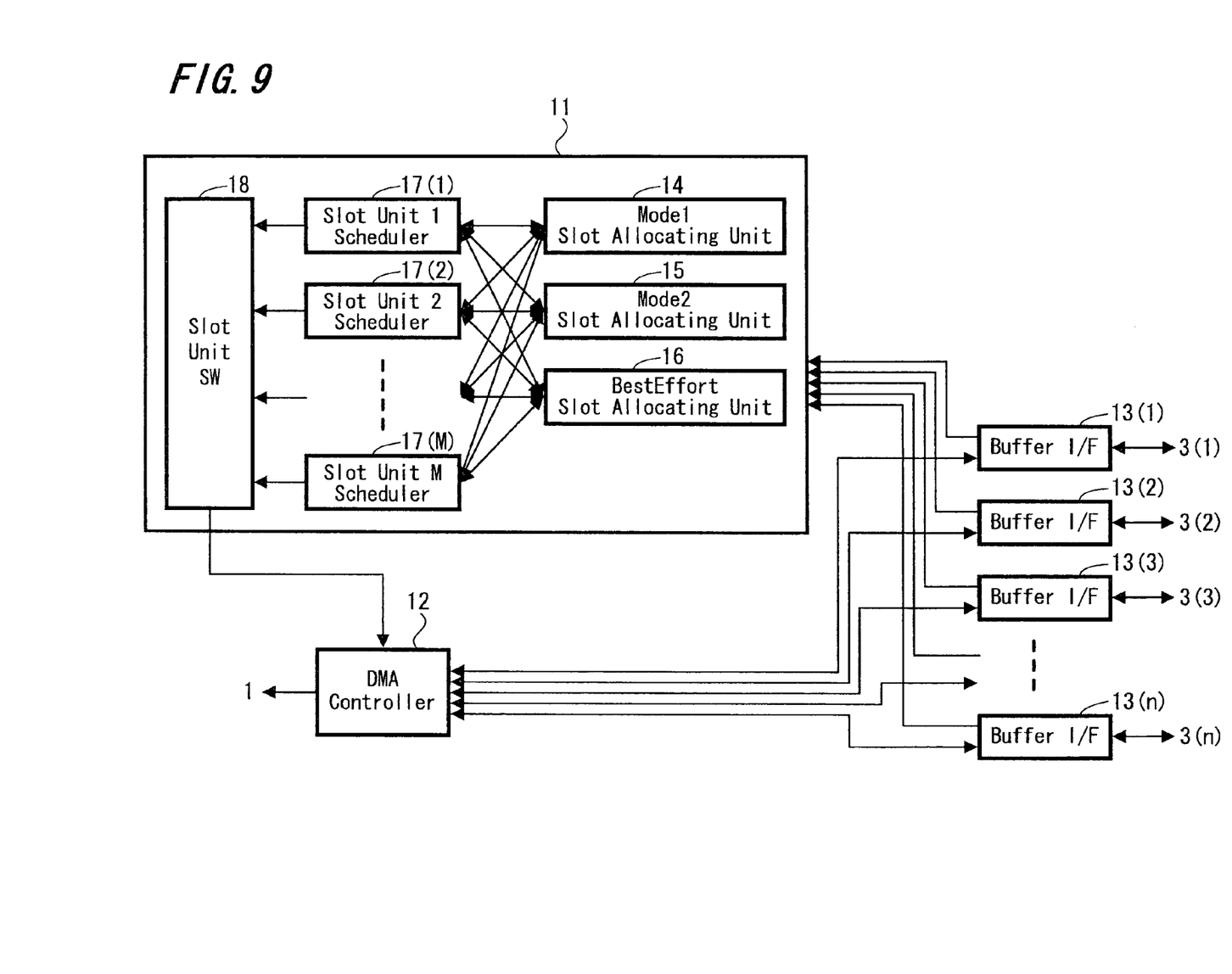
FIG. 9 is a diagram showing an example of a configuration of the slot access controller shown in FIG. 6.

Finally, an example of a configuration of a slot access controller 2 for obtaining the method of controlling access shown in FIG. 7 is described with reference to FIG. 9. The slot access controller 2 includes: a slot controller 11, DMA (Direct Memory Access) controller 12 for accessing to a flash memory 1 (FIG. 6) and N buffer interfaces 13 (13(1) to 13(n)) that are interfaces with the buffer memories 3(1) to 3(n) (FIG. 6).

The slot controller 11 includes: a Mode1 slot allocating unit 14, Mode2 slot allocating unit 15, BestEffort slot allocating unit 16, M (M=3 in the case of FIG. 7) SlotUnit1 schedulers 17(1) to SlotUnitM Scheduler 17(M) and a slot unit switch 18.

Upon opening of any port among Port1 to Portn, and transmitting request from the buffer memory 3 corresponding to the port to the slot controller 11 through the buffer interface 13, the slot controller 11 determines from the content of the request that the port is of access mode of Mode1, Mode2 or BestEffort.

Then, as illustrated in FIG. 7, in the case where the port is of the Mode1, the Mode1 slot allocating unit 14 performs processing of allocating a time slot of the respective ports to the Mode1 access slot areas in M SlotUnits (SlotUnit1 to SlotUnitM).

On the other hand, in the case where the port is of the Mode2, the Mode2 slot allocating unit 15 performs processing of allocating a time slot of the port to the Mode2 access slot area in each of the SlotUnits in order, as is illustrated in FIG. 7.

On the other hand, as shown in FIG. 7, in the case where the port is of the BestEffort, the BestEffort slot allocating unit 16 performs processing of allocating a time slot of the port to the BestEffort access slot area in each of the SlotUnits in order.

Slotunit1 scheduler 17(1) to SlotunitM scheduler 17(M) perform processing of scheduling respective SlotUnit1 to SlotUnitM, as is illustrated in FIG. 7, on the basis of the results allocated by those slot allocating units 14 to 16.

On the basis of the scheduling results of the Slotunit1 Scheduler 17(1) to SlotunitM Scheduler 17(M) (specifically, the scheduled results of one period of a total schedule), the slot unit switch 18 performs the control of switching data that is transmitted to the DMA controller 12 through the buffer interface 13 from each buffer memory 3 one by one, and of transferring the data from the DMA controller 12 to the flash memory 1. Further, the slot unit switch 18 performs the control of switching a buffer interface 13 to which the data transmitted from the flash memory 1 to the DAM controller 12 is transmitted.

It should be noted that access for data reproduction and access for data storage are employed respectively as examples of the Mode1 and Mode2 in the above explanation. However, an embodiment of the present invention is not limited thereto, and can be applied to any case in which two kinds of access having different access periods necessary for securing a band are implemented from a plurality of ports.

Further, an embodiment of the present invention is applied to a flash memory device as described above. However, an embodiment of the present invention is not limited thereto, and can be applied to any storage device other than the flash memory device in the case where two kinds of access having different access periods necessary for securing a band are implemented from a plurality of ports.

It should be understood by those skilled in the art that various modifications, combinations, sub-combinations and alterations may occur depending on design requirements and other factors insofar as they are within the scope of the appended claims or the equivalents thereof.

What is claimed is:

1. A storage device, comprising:
a plurality of ports for allowing at least a first kind of access and a second kind of access,
wherein the second kind of access having a band-secured access period longer than a band-secured access of the first kind of access; and
access control means for preparing a total schedule by connecting, on a time axis a a plurality of slot units,
wherein each slot unit having a length within the band-secured access period of the first kind of access so that the access period of the second kind of access is within the band-secured access period, allocating one time slot to one slot unit regarding the ports for the first kind of access, and allocating one time slot to one period of the total schedule regarding the ports for the second kind of access among the plurality of ports, and
wherein an interval at which the first kind of access is repeated is shorter than an interval at which the second kind of access is repeated, and
wherein the interval at which the first kind of access is repeated is shorter than the interval at which the second kind of access is repeated as a function of an integer representing the plurality of the slot units.

2. A storage device according to claim 1,
wherein the access control means locates a time slot of ports for a kind of access not band-secured among the plurality of ports, at the end of the slot unit, and controls the length of the time slot so that the length of the slot unit is within the band-secured access period for the first kind of access.

3. A storage device according to claim 1,
wherein the storage device uses a flash memory as a storage medium;
the first kind of access is access to reproduce data; and the second kind of access is access to store data.

4. A method of controlling access performed by an access controller in a storage device having a plurality of ports, comprising the steps of:
accessing the ports with a first kind of access;
accessing the ports with a second kind of access having a band-secured access period longer than that of the first kind of access;
preparing a total schedule by connecting on a time axis a plurality of slot units each having a length within the band-secured access period of the first kind of access so that the access period of the second kind of access is within the band-secured access period;
allocating one time slot to one slot unit regarding the ports for the first kind of access among the plurality of ports; and
allocating one time slot to one period of the total schedule regarding the ports for the second kind of access among the plurality of ports,
wherein an interval at which the first kind of access is repeated is shorter than an interval at which the second kind of access is repeated, and
wherein an interval at which the first kind of access is repeated is shorter than the interval at which the second kind of access is repeated as a function of an integer representing the plurality of the slot units.

5. A storage device, comprising:
a plurality of ports allowing for at least a first kind of access and a second kind of access,
wherein the second kind of access having a band-secured access period longer than a band-secure access period of the first kind of access, and
an access controller configured to prepare a total schedule by connecting on a time axis a plurality of slot units each having a length within the band-secured access period of the first kind of access so that the access period of the second kind of access is within the band-secured access period, allocate one time slot to one slot unit regarding the ports for the first kind of access, and allocate one time slot to one period of the total schedule regarding the ports for the second kind of access among the plurality of ports, wherein an interval at which the first kind of access is repeated is shorter than an interval at which the second kind of access is repeated, and wherein the interval at which the first kind of access is repeated is shorter than the interval at which the second kind of access is repeated as a function of an integer representing the plurality of the slot units.

* * * * *